United States Patent
Gu et al.

(10) Patent No.: US 12,099,477 B2
(45) Date of Patent: Sep. 24, 2024

(54) REDUCING REDUNDANCY IN SYNCHRONOUS REPLICATION OF METADATA WITH A JOURNAL LOG

(71) Applicant: EMC IP Holding Company LLC, Hopkinton, MA (US)

(72) Inventors: Joseph Yuan Gu, Beijing (CN); Tianfang Xiong, Shanghai (CN); Qi Qu, Shanghai (CN); Weibing Zhang, Beijing (CN); Lei Gao, Beijing (CN); Wai C. Yim, Merrimack, NH (US); Chen Gong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 358 days.

(21) Appl. No.: 17/510,551

(22) Filed: Oct. 26, 2021

(65) Prior Publication Data
US 2023/0125833 A1   Apr. 27, 2023

(51) Int. Cl.
G06F 15/00   (2006.01)
G06F 16/16   (2019.01)
G06F 16/172  (2019.01)
G06F 16/18   (2019.01)
G06F 16/182  (2019.01)

(52) U.S. Cl.
CPC ........ *G06F 16/1844* (2019.01); *G06F 16/164* (2019.01); *G06F 16/172* (2019.01); *G06F 16/1805* (2019.01)

(58) Field of Classification Search
None
See application file for complete search history.

(56) References Cited

U.S. PATENT DOCUMENTS

| | | | |
|---|---|---|---|
| 7,620,721 B2 * | 11/2009 | Suriyanarayanan | G06F 16/1844 709/224 |
| 9,507,798 B1 | 11/2016 | Zhao et al. | |
| 10,812,584 B2 | 10/2020 | Yang et al. | |
| 2020/0133507 A1 | 4/2020 | Liu et al. | |
| 2020/0301947 A1 * | 9/2020 | Botev | G06F 16/256 |
| 2021/0117094 A1 | 4/2021 | Vankamamidi et al. | |

OTHER PUBLICATIONS

Lee Juchang. Mar. 2018. the VLDB Journal. Parallel replication across formats for scaling out mixed OLTP/OLAP workloads in main-memory databases. pp. 421-444.*

* cited by examiner

*Primary Examiner* — Tuankhanh D Phan
(74) *Attorney, Agent, or Firm* — BainwoodHuang

(57) ABSTRACT

A method of performing synchronous replication from a primary storage system apparatus (PSSA) to a secondary storage system apparatus (SSSA) is provided. The method includes (a) in response to write requests received by the PSSA, (i) calculating metadata changes by the PSSA for accommodating the write requests, (ii) generating, by the PSSA, metadata journal log entries that describe the metadata changes, and (iii) mirroring the metadata journal log entries from the PSSA to the SSSA; (b) regenerating the metadata changes by the SSSA based on the metadata journal log entries mirrored from the PSSA to the SSSA; and (c) writing the regenerated metadata changes to persistent storage of the SSSA. A method performed by the SSSA is also provided. An apparatus, system, and computer program product for performing similar methods are also provided.

22 Claims, 3 Drawing Sheets

REDUCING REDUNDANCY IN SYNCHRONOUS REPLICATION OF METADATA WITH A JOURNAL LOG

BACKGROUND

Data storage systems are arrangements of hardware and software in which storage processors are coupled to arrays of non-volatile storage devices, such as magnetic disk drives, electronic flash drives, and/or optical drives. The storage processors service storage requests arriving from host machines ("hosts"), which specify blocks, files, and/or other data elements to be written, read, created, deleted, etc. Software running on the storage processors manages incoming storage requests and performs various data processing tasks to organize and secure the data elements on the non-volatile storage devices.

Some data storage systems employ remote replication to achieve protection against data loss and/or to provide for higher availability of data. Some replication systems employ synchronous replication, which allows for instant failover. Synchronous replication may be achieved by mirroring all writes received at a primary storage system to also be sent to a secondary storage system.

SUMMARY

Often, writes to a storage system may require making many small changes to metadata, sometimes in disparate locations. For example, in many systems, when new data is appended to the end of a file, the file's Mode must be amended to update its modification time and file size and an indirect block must be updated to point to a new data block. In some cases, one indirect block must also be updated to point to a new indirect block. Thus, potentially 3 or 4 small metadata changes must be made to noncontiguous locations for a single write. Since writes to data storage are typically made with a block-level granularity (e.g., at least 4 or 8 kilobytes (KB)), a write of just 1 block of data might require writing 4 or 5 blocks worth of data. This multiplication effect may be exacerbated if many small writes that target the same sections of the metadata repeatedly over a short period of time, requiring the same metadata blocks to be updated repeatedly. Thus, some modern storage systems use a metadata journal log to temporarily cache a description of the metadata changes associated with a write. Changes associated with several writes that all affect the same metadata over a short period of time may then be combined into an aggregated metadata write, reducing the number of metadata blocks that need to be written per block of data written.

When synchronous replication is employed together with metadata journal logging, then data blocks, metadata journal log entries, and metadata blocks are typically all mirrored. Even if the metadata changes are still combined into aggregated metadata writes to reduce the bandwidth over the mirroring channel, more bandwidth than necessary may still be transferred across the mirroring channel because metadata blocks are typically 4 or 8 KB and it is possible that only small regions within those blocks have actually changed.

Thus, it would be desirable to implement synchronous replication in systems that use metadata journal logging to further reduce the necessary bandwidth over the mirroring channel. This result may be accomplished by refraining from mirroring metadata blocks and instead playing back the metadata changes at the mirrored location using the mirrored metadata journal entries. In some embodiments, instead of mirroring a complete metadata write command over the mirroring channel, a shell metadata write command may be sent in its place.

In one embodiment, a method of performing synchronous replication from a primary storage system apparatus (PSSA) to a secondary storage system apparatus (SSSA) is provided. The method includes (a) in response to write requests received by the PSSA, (i) calculating metadata changes by the PSSA for accommodating the write requests, (ii) generating, by the PSSA, metadata journal log entries that describe the metadata changes, and (iii) mirroring the metadata journal log entries from the PSSA to the SSSA; (b) regenerating the metadata changes by the SSSA based on the metadata journal log entries mirrored from the PSSA to the SSSA; and (c) writing the regenerated metadata changes to persistent storage of the SSSA. An apparatus, system, and computer program product for performing a similar method are also provided.

A method performed by an SSSA of performing synchronous replication from a PSSA is also provided. The method includes (a) receiving mirrored metadata journal log entries from the PSSA, the mirrored metadata journal log entries having been generated by the PSSA in response to write requests received by the PSSA by (i) calculating metadata changes for accommodating the write requests, (ii) generating the metadata journal log entries to describe the metadata changes; (b) regenerating the metadata changes based on the received metadata journal log entries mirrored from the PSSA to the SSSA; and (c) writing the regenerated metadata changes to persistent storage of the SSSA. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments are directed to techniques for implementing synchronous replication in systems that use metadata journal logging to reduce the bandwidth needed over the mirroring channel. This result may be accomplished by refraining from mirroring metadata blocks and instead playing back the metadata changes at the mirrored location using the mirrored metadata journal entries. In some embodiments, instead of mirroring a complete metadata write command over the mirroring channel, a shell metadata write command may be sent in its place.

Figure 1:
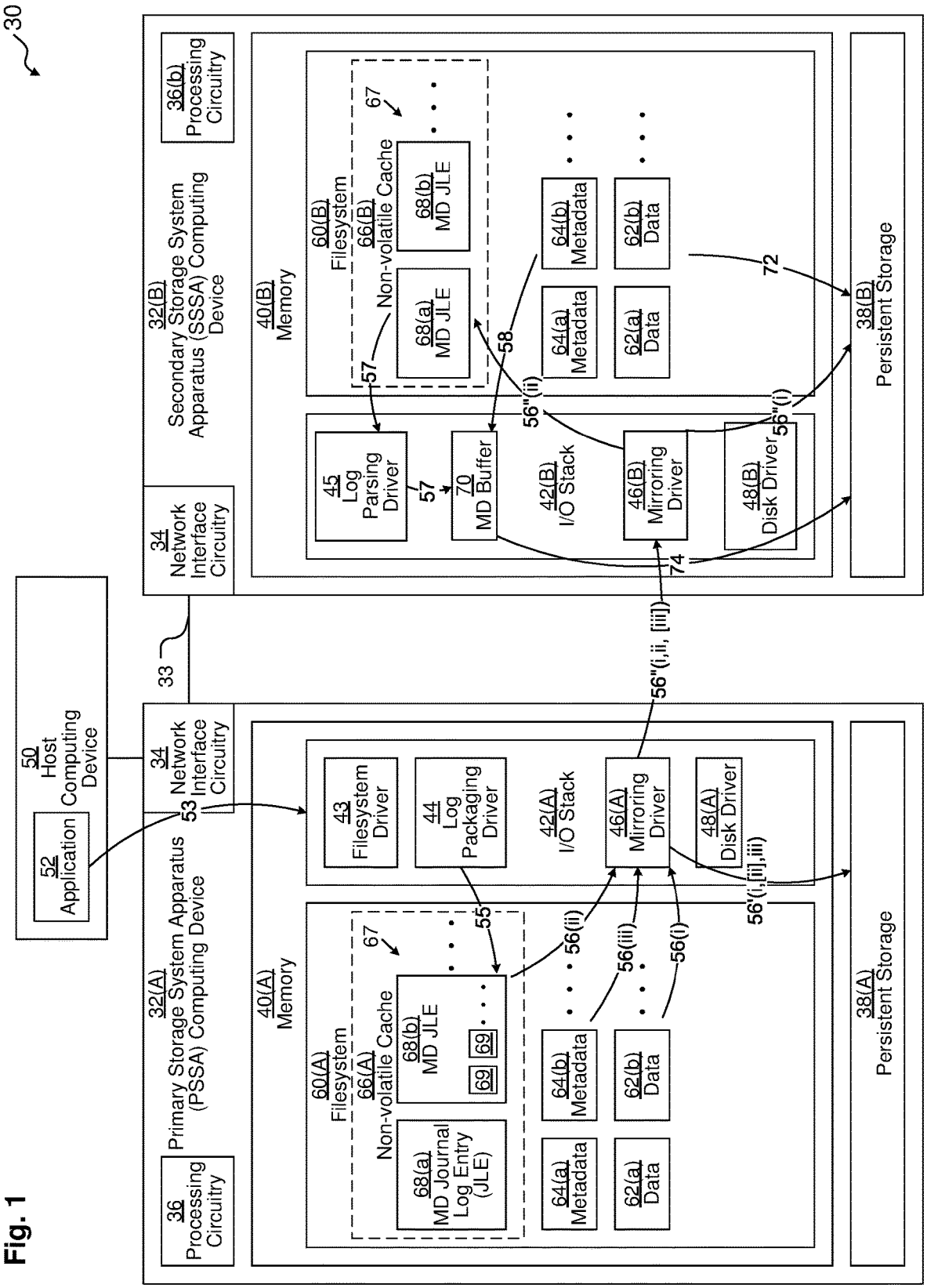
FIG. 1 is a block diagram depicting an example system, apparatus, and data structure arrangement for use in connection with various embodiments.

FIG. 1 depicts an example system 30 for use in connection with various embodiments. System 30 includes two computing devices 32 dedicated primarily to data storage: a primary storage system apparatus (PSSA) and a secondary storage system apparatus (SSSA) connected over a mirroring connection 33. System 30 may also include one or more host computing devices 50.

A computing device 32, 50 may be any kind of computing device, such as, for example, a personal computer, workstation, server computer, enterprise server, rack-mount server, data storage array device, laptop computer, tablet computer, smart phone, mobile computer, etc. Each computing device 32(A), 32(B) serves as a data storage system.

Each computing device 32 includes network interface circuitry 34, processing circuitry 36, persistent storage 38, and memory 40. Each computing device 32 may also include various other components that are not depicted, such as storage interface circuitry, caches, user interface circuitry, interconnection circuitry, a chassis, etc.

Processing circuitry 36 may include any kind of processor or set of processors configured to perform operations, such as, for example, a single- or multi-core microprocessor, a set of multiple microprocessors, etc.

Network interface circuitry 34 may include one or more Ethernet cards, cellular modems, Fibre Channel (FC) adapters, InfiniBand adapters, wireless networking adapters (e.g., Wi-Fi), and/or other devices for connecting two computing devices 32, 50 over a network connection, such as, for example, a LAN, WAN, SAN, the Internet, a wireless communication network, a virtual network, a fabric of interconnected switches, a point-to-point connection, etc. Network interface circuitry 34 allows computing devices 32 to communicate over the network connection. Network interface circuitry 34 also allows PSSA 32(A) to communicate with host computing device 50. In some embodiments, network interface circuitry 34 allows PSSA 32(A) to communicate with SSSA 32(B) with the mirroring connection 33 being implemented as a network connection. In other embodiments, mirroring connection 33 may be some other type of connection, such as an inter-processor bus.

Persistent storage 38 includes a plurality of non-transitory persistent storage drives (not depicted), such as, for example, hard disk drives, solid-state storage devices (SSDs), flash drives, etc. Persistent storage 38(A) is used for storing filesystems and/or logical disks hosted by PSSA 32(A), and persistent storage 38(B) is used for storing filesystems and/or logical disks hosted by SSSA 32(B). In some embodiments, persistent storage 32(A), 32(B) may each include one or more RAID groups. In some embodiments, rather than being part of computing devices 32, persistent storage 38 may be external to computing devices 32.

Memory 40 may be any kind of digital system memory, such as, for example, random access memory (RAM). Memory 40 stores an operating system (OS) (not depicted) in operation (e.g., a Linux, UNIX, Windows, MacOS, or similar operating system). In some embodiments (depicted by a dashed line), memory 40 includes a non-volatile cache 66, such as, for example, a high-speed cache. Non-volatile memory cache 66 may include, for example, Intel Optane memory, a high-speed SSD drive, battery-backed RAM, etc.

Memory 40 also stores an input/output (I/O) stack 42 made up of a set of stacked drivers, at least including a disk driver 48 and a mirroring driver 46. As depicted, I/O stack 42(A) for PSSA 32(A) also includes a filesystem driver 43 and a log packaging driver 44, and I/O stack 42(B) for SSSA 32(B) also includes a log parsing driver 45, although it should be understood that these drivers 43, 44, 45 may also exist in the other I/O stack 42. It should also be understood that, in other embodiments (not depicted), similar functionality may be implemented using a different combination of drivers. Drivers 43, 44, 45, 46, 48 and other drivers of I/O stacks 42 operate on processing circuitry 36 to provide data storage and related services.

Memory 40 also stores at least a portion of one or more filesystems 60. Filesystem 60(A) is managed by I/O stack 42(A) of PSSA 32(A), and it is mirrored onto SSSA 32(B) as corresponding filesystem 60(B). In some embodiments, some filesystems 60 may be managed by one computing device 32(A) and mirrored to the other computing device 32(B), while other filesystems 60 may be managed by the other computing device 32(B) and mirrored to the first computing device 32(A). As used herein, the term PSSA refers to the computing device 32 that manages a particular filesystem 60, and the term SSSA refers to the computing device 32 onto which that filesystem 60 is mirrored.

A filesystem 60 includes blocks of both data 62 (depicted as data blocks 62(a), 62(b), . . . ) and metadata 64 (depicted as metadata blocks 64(a), 64(b), . . . ). Most data blocks 62 and metadata blocks 64 within the filesystem 60 are stored on persistent storage 38. Some recently-modified data blocks 62 and metadata blocks 64 may be stored only in memory 40 as "dirty" blocks, while other data blocks 62 and metadata blocks 64 that are stored within persistent storage 38 may also be cached in memory 40.

Filesystem 60 also includes a metadata journal log 67, which stores a set of metadata (MD) journal log entries (JLEs) 68 (depicted as MD JLEs 67(a), 67(b), . . . ). Each MD JLE 68 stores one or more descriptions of metadata changes 69. In some embodiments, MD journal log 67 only stores MD JLEs 68 that include descriptions of metadata changes 69 that have not yet been persisted into metadata 64 stored on persistent storage 38. In other embodiments, MD journal log 67 may store MD JLEs 68 that include descriptions of metadata changes 69 that have already been persisted into metadata 64 stored on persistent storage 38, but those MD JLEs 68 that include descriptions of metadata changes 69 that have already been persisted may be evicted from the non-volatile cache 66 and stored only in the persistent storage 38.

Memory 40 may also store various other data structures used by the OS, I/O stack 42, drivers 43, 44, 45, 46, 48, and various other applications and drivers. In some embodiments, memory 40 may also include a persistent storage portion (not depicted). Persistent storage portion of memory 40 may be made up of one or more persistent storage devices, such as, for example, magnetic disks, flash drives, solid-state storage drives, or other types of storage drives. Persistent storage portion of memory 40 is configured to store programs and data even while the computing device 32 is powered off. The OS, I/O stack 42, drivers 43, 44, 45, 46, 48, and various other applications and drivers are typically stored in this persistent storage portion of memory 40 or within persistent storage 38 so that they may be loaded into a system portion of memory 40 upon a system restart or as needed. The OS, I/O stack 42, drivers 43, 44, 45, 46, 48, and various other applications and drivers, when stored in non-transitory form either in the volatile portion of memory 40 or in persistent portion of memory 40 or in persistent storage 38, each form a computer program product. The processing circuitry 36 running one or more applications thus forms a specialized circuit constructed and arranged to carry out the various processes described herein.

In operation, an application 52 running on a host computing device 50 sends a write command 53 to I/O stack 42(A) running on PSSA 32(A). It should be understood that host computing device 50 has a similar structure to computing devices 32 in that host computing device 50 also at least includes processing circuitry 36, network interface circuitry 34, and memory 40. Application 52 is stored within memory 40 of host computing device 50 and it executes on processing circuitry 36 of host computing device 50.

Upon I/O stack 42(A) receiving the write command 53, filesystem driver 43 operates to convert the write command 53 into a set of one or more data blocks 62 as well as metadata changes necessitated by the write command 53, such as updates to a file size and file modification time, insertions of block pointers and indirect block pointers, creation of new files and directories, etc. Log packaging driver 44 then creates (step 55) a MD JLE 68 associated with the write command 53 that includes descriptions 59 of the metadata changes necessitated by the write command 53. In some embodiments, MD JLEs 68 have a maximum size (e.g., 512 bytes), so some write commands 53 may require more than one MD JLE 68.

Filesystem driver 43 also issues a data write command 56(i) and an MD JLE write command 56(ii) to mirroring driver 46(A). Mirroring driver 46(A) receives various write commands 56 and forwards them on to both a local disk driver 48(A) as local write commands 56' and over mirroring connection 33 to a remote mirroring driver 46(B) as remote write commands 56". In some cases, mirroring driver 46(A) modifies a write command 56 prior to reissuing it as a local write command 56' or a remote write command 56". Thus, for example, in some embodiments, mirroring driver 46(A) modifies MD JLE write command 56(ii) by adding a tag to remote MD JLE write command 56"(ii) indicating that it includes an MD JLE 68 and may need to remain in non-volatile cache 66(B) until it can be fully processed. In some embodiments, instead of reissuing MD JLE write command 56(ii) to local disk driver 48(A) as local MD JLE write command 56'(ii), mirroring driver 46(A) may reissue MD JLE write command 56(ii) to local non-volatile cache 66(A) as local MD JLE write command 56'(ii). After local write commands 56'(i), 56'(ii) and remote write commands 56"(i), 56"(ii) have completed, filesystem driver 43 also issues a metadata write command 56(iii) to persist one or more metadata blocks 64 affected by the metadata changes of the descriptions 69 of the MD JLE 68. Mirroring driver 46(A) then forwards the metadata block(s) 64 on to local disk driver 48(A) as local metadata write command 56'(iii). In some embodiments, mirroring driver 46(A) refrains from sending a remote metadata write command 56"(iii) in response. In other embodiments, prior to sending a remote metadata write command 56"(iii) over mirroring connection 33 to remote mirroring driver 46(B), mirroring driver 46(A) removes the contents of metadata block(s) 64, so that the remote metadata write command 56"(iii) is a shell command.

Remote mirroring driver 46(B), upon receiving remote write command 56"(i), stores a data block 62 included therein into persistent storage 38(B) and/or memory 40(B). Remote mirroring driver 46(B), upon receiving remote MD JLE write command 56"(ii), stores a MD JLE 68 included therein into non-volatile cache 66(B) and/or persistent storage 38(B). Log parsing driver 45 then operates (step 57) to play the metadata changes described by the descriptions 69 in that MD JLE 68 into a metadata buffer 70. At some point, log parsing driver 45 may also read (step 58) preexisting metadata from a metadata block 64 stored in memory 40(B) or persistent storage 38(B) into MD buffer 70. Eventually, remote disk driver 48(B) stores (step 74) the contents of the MD buffer 70 to persistent storage 38(B) as one or more metadata blocks 64. In some embodiments, log parsing driver performs step 57 and/or step 58 in response to the remote mirroring driver 46(B) receiving remote MD JLE write command 56"(ii). In other embodiments, log parsing driver waits to perform step 57 and/or step 58 until the remote mirroring driver 46(B) receives a remote metadata write command shell 56"(iii).

Figure 2:
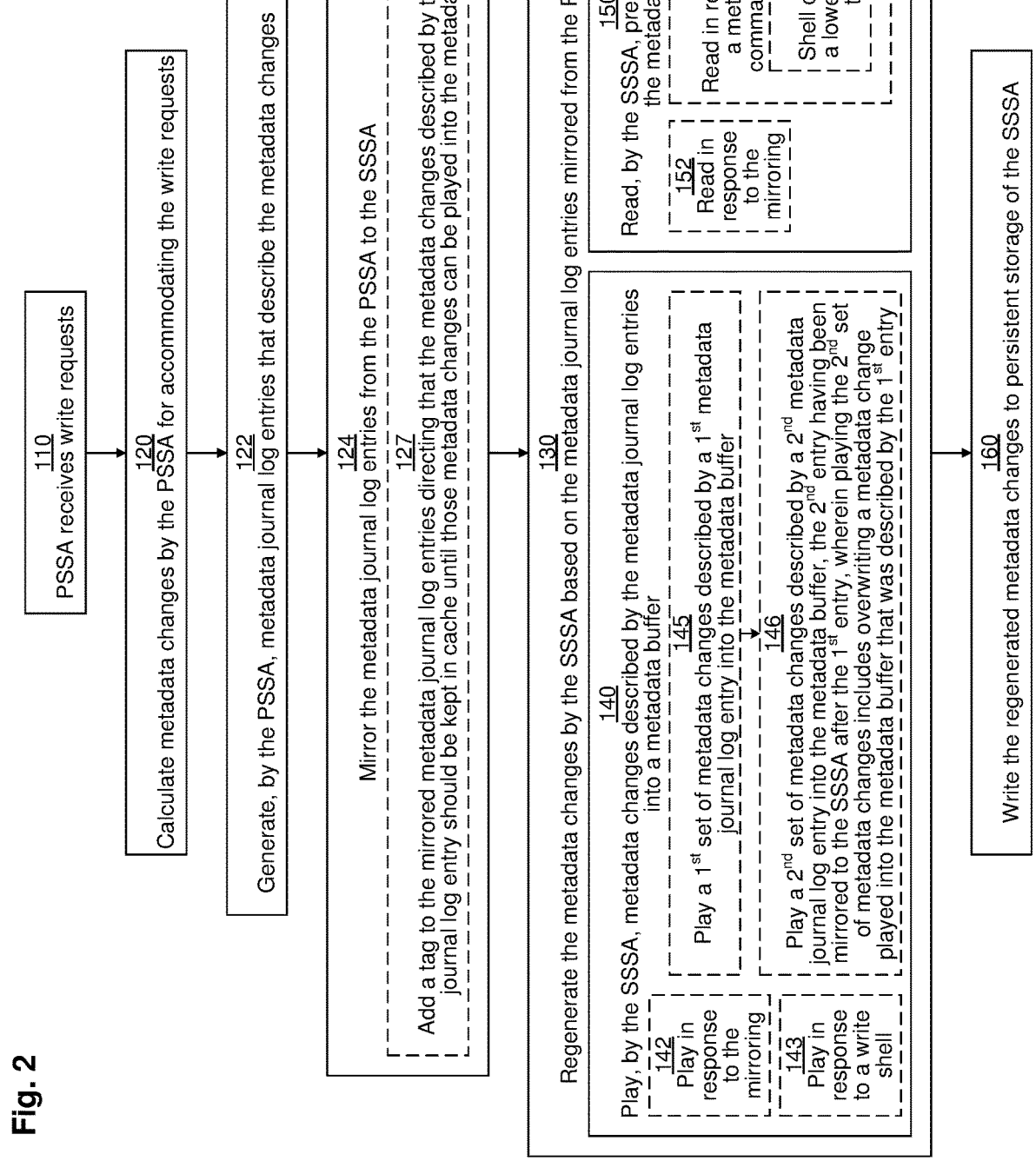
FIG. 2 is a flowchart depicting an example procedure according to various embodiments.

FIG. 2 illustrates an example method 100 performed by system 30 for performing synchronous replication from PSSA 32(A) to SSSA 32(B). It should be understood that any time a piece of software (e.g., the OS, I/O stack 42, drivers 43, 44, 45, 46, 48, etc.) is described as performing a method, process, step, or function, what is meant is that a computing device 32 on which that piece of software is running performs the method, process, step, or function when executing that piece of software on its processing circuitry 36. It should be understood that one or more of the steps or sub-steps of method 100 may be omitted in some embodiments. Similarly, in some embodiments, one or more steps or sub-steps may be combined together or performed in a different order. Certain sub-steps are marked with dotted lines, indicating that they are either optional or alternatives.

In step 110, PSSA 32(A) receives write requests 53 from an application 52. Then, in step 120, filesystem driver 43 of PSSA 32(A) calculates metadata changes for accommodating the write requests 53, thereby creating metadata change descriptions 69. Then, in step 122, log packaging driver 44 of PSSA 32(A) generates MD JLEs 68 that describe the metadata changes (e.g., MD JLEs 68 that include the metadata change descriptions 69). Then, in step 124, mirroring driver 46(A) of PSSA 32(A) mirrors the MD JLEs 68 to the SSSA 32(B) within remote MD JLE write commands 56"(ii). In some embodiments, step 124 includes sub-step 127, in which mirroring driver 46(A) adds a tag to the MD JLE write commands 56"(ii) directing that the metadata changes described by that MD JLE 68 should be kept in cache 66(B) until those metadata changes can be played into the metadata buffer 70.

Then, in step 130, SSSA 32(B) regenerates the metadata changes based on the MD JLEs 68 mirrored from the PSSA 32(A) to the SSSA 32(B). In some embodiments, step 130 includes sub-steps 140 and 150.

In sub-step 140, log parsing driver 45 of SSSA 32(B) plays metadata changes described (see descriptors 69) by the MD JLEs 68 into a metadata buffer 70. In some embodiments (sub-step 142), log parsing driver 45 performs step 140 in response to the mirroring of step 124, i.e., upon receiving the MD JLE write commands 56"(ii) from the PSSA 32(A). In other embodiments, (sub-step 143), log parsing driver 45 performs step 140 in response to receiving metadata write command shells 56"(iii) from the PSSA 32(A).

In some embodiments, sub-step 140 includes sub-steps 145-146. In sub-step 145, log parsing driver 45 plays a first set of metadata changes described by a first MD JLE 68(a) into the MD buffer 70. Subsequently, log parsing driver 45 plays a second set of metadata changes described by a second MD JLE 68(b) into the MD buffer 70, the second MD JLE 68(b) having been mirrored to the SSSA 32(B) after the first MD JLE 68(a), wherein playing the second set of metadata changes includes overwriting a metadata change played into the metadata buffer 70 that was described by the first MD JLE 68(a).

As a first example, in an embodiment in which metadata blocks 64 are 8 KB in size, suppose a change description 69 from first MD JLE 68(*a*) indicates that addresses 3900-4099 of a MD block 64(*a*) should be written over with zeroes and a change description 69 from second (subsequent) MD JLE 68(*b*) indicates that addresses 4000-4199 of that MD block 64(*a*) should be written over with ones. Then, in step 145, log parsing driver 45 will write zeroes to addresses 3900-4099 of the MD buffer 70 representing changes to MD block 64(*a*). Subsequently, in step 146, log parsing driver 45 will write ones to addresses 4000-4199 of the MD buffer 70 again representing changes to MD block 64(*a*). At that point, the zeroes at addresses 4000-4099 have been overwritten with ones, so addresses 3900-3999 will be filled with zeroes and addresses 4000-4199 will be filled with ones.

As a second example, in an embodiment in which metadata blocks 64 are 8 KB in size, suppose a change description 69 from first MD JLE 68(*a*) indicates that addresses 8000-8199 offset from the beginning of MD block 64(*a*) should be written over with zeroes and a change description 69 from second (subsequent) MD JLE 68(*b*) indicates that addresses 8100-8299 should be written over with ones. Because the addresses cross a block boundary, MD buffer 70 represents two adjacent metadata blocks 64(*a*), 64(*b*). Then, in step 145, log parsing driver 45 will write zeroes to addresses 8000-8199 of the MD buffer 70 representing changes to MD blocks 64(*a*)-64(*b*). Subsequently, in step 146, log parsing driver 45 will write ones to addresses 8100-8299 of the MD buffer 70 again representing changes to MD blocks 64(*a*)-64(*b*). At that point, the zeroes at addresses 8100-8199 have been overwritten with ones, so addresses 8000-8099 will be filled with zeroes and addresses 8100-8299 will be filled with ones, covering two adjacent metadata blocks 64(*a*), 64(*b*).

In sub-step 150, log parsing driver 45 of SSSA 32(B) reads preexisting metadata into the metadata buffer 70. Thus, continuing the first example described in connection with steps 145-146, log parsing driver 45 of SSSA 32(B) reads addresses 0-3899 from metadata block 64(*a*) into addresses 0-3899 of MD buffer 70 and also reads addresses 4200-8191 from metadata block 64(*a*) into addresses 4200-8191 of MD buffer 70.

Instead considering the second example described in connection with steps 145-146, log parsing driver 45 of SSSA 32(B) reads addresses 0-7999 from metadata block 64(*a*) into addresses 0-7999 of MD buffer 70 and also reads addresses 108-8191 from metadata block 64(*b*) into addresses 8300-16383 of MD buffer 70.

In some embodiments (sub-step 152), log parsing driver 45 performs step 150 in response to the mirroring of step 124, i.e., upon receiving the MD JLE write commands 56″(*ii*) from the PSSA 32(A). In other embodiments, (sub-step 153), log parsing driver 45 performs step 150 in response to receiving metadata write command shells 56″(*iii*) from the PSSA 32(A). In some of these embodiments (sub-step 154), the metadata write command shells 56″(*iii*) include a lower-deck address of the metadata block 64. A lower-deck filesystem is a sparse filesystem which implements a set of logical disks. An upper-deck filesystem is a filesystem (e.g., filesystem 60) that is stored on one of the logical disks represented by the lower-deck filesystem. In some embodiments in which filesystem 60 is an upper-deck filesystem stored on a logical disk implemented by a lower-deck filesystem, I/O stack 42(B) SSSA 32(B) is not aware of the lower-deck addresses of blocks 62, 64 of the filesystem 60(B) until made aware of the lower-deck addresses by PSSA 32(A). Thus, although log parsing driver 45 can play back the metadata changes into a MD buffer 70 (sub-step 140) without knowing the lower-deck addresses, log parsing driver 45 cannot read the preexisting metadata into the MD buffer 70 from the metadata blocks 64 (sub-step 150) until it learns the lower-deck addresses from the metadata write command shells 56″(*iii*).

Finally, in step 160, disk driver 48(B) writes the regenerated metadata changes to persistent storage 38(B) of the SSSA 32(B) by writing the MD buffer 70 to persistent storage 38(B).

Figure 3:
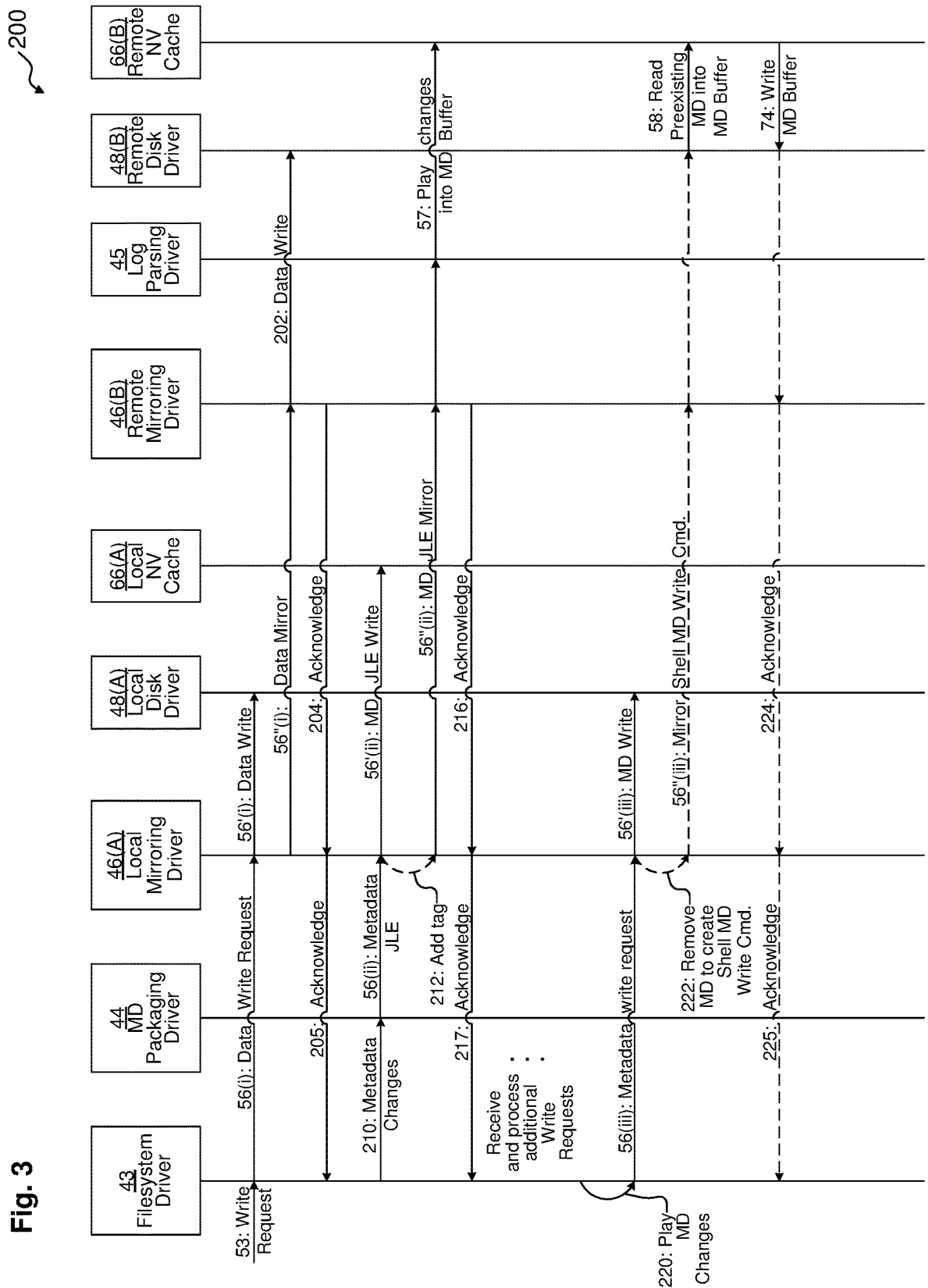
FIG. 3 is a sequence diagram depicting an example procedure according to various embodiments.

FIG. 3A depicts an example method 200 performed by system 30.

First, filesystem driver 43 of PSSA 32(A) receives a write request 53. Then, filesystem driver 43 sends a data write request 56(*i*) containing one or more data blocks 62 that are written in fulfillment of the write request 53 to local mirroring driver 46(A). Local mirroring driver 46(A) sends both a local data write request 56′(*i*) to local disk driver 48(*a*) and a remote data mirrored write request 56″(*i*) to remote mirroring driver 46(B) of SSSA 32(B). Remote mirroring driver 46(B) then fulfills the remote data mirrored write request 56″(*i*) via remote disk driver 48(B). Thus, the data block(s) is written to both local persistent storage 38(A) and remote persistent storage 38(B), after which remote mirroring driver 46(B) returns an acknowledgment 204 to local mirroring driver 46(A), which in-turn sends an acknowledgment 205 to the filesystem driver 43.

Upon receiving the acknowledgment 205 of the completion of the data write request 56(*i*), filesystem driver 43 generates and sends metadata changes 210 that also fulfill the write request 53 to MD packaging driver 44. MD packaging driver 44 then generates corresponding metadata change descriptors 69 and packages them into one or more MD JLEs 68, upon which it sends an MD JLE write request 56(*ii*) containing the one or more MD JLEs 68 to local mirroring driver 46(A). Local mirroring driver 46(A) sends a local MD JLE write request 56′(*ii*) to store the one or more MD JLEs 68 to local non-volatile cache 66(A) (or, in some embodiments, to local disk driver 48(*a*)). In some embodiments, local mirroring driver 46(A) also adds a tag 212 (see sub-step 127 above) to generate remote MD JLE write request 56″(*ii*), which it sends to remote mirroring driver 46(B) of SSSA 32(B).

Remote mirroring driver 46(B) then calls upon log parsing driver 45 to parse the remote MD JLE write request 56″(*ii*) and play (step 57) the metadata changes 210 into the MD buffer 70, after which remote mirroring driver 46(B) returns an acknowledgment 216 to local mirroring driver 46(A), which in-turn sends an acknowledgment 217 to the filesystem driver 43. In some embodiments, step 57 may be delayed, and remote mirroring driver 46(B) may return acknowledgment 216 immediately upon persisting the MD JLE 68 into non-volatile cache 66(B) without playing back the metadata changes 210 yet.

At this point, the above steps may be repeated for several different write requests 53, some of which may modify the same metadata blocks 64.

At some point, filesystem driver 43 plays (step 220) the metadata changes 210 described by the descriptions 69 in one or more MD JLEs 68 to generate one or more metadata blocks 64 at the PSSA 32(A). Then, filesystem driver 43 sends a metadata write request 56(*iii*) containing one or more metadata blocks 64 that are modified in fulfillment of the write request 53 to local mirroring driver 46(A). Local mirroring driver 46(A) sends a local metadata write request 56′(*iii*) to store the one or more metadata blocks 64 to local disk driver 48(*a*) for storage in persistent storage 38(A). In some embodiments, local metadata write request 56'(*iii*) includes a lower-deck address of the one or more metadata blocks 64 as well as an upper-deck address. In some embodiments, local mirroring driver 46(A) strips out (step 222) the contents of the one or more metadata blocks 64 to create a remote metadata write request shell 56"(*iii*) that is much smaller than the local metadata write request 56'(*iii*), and sends the remote metadata write request shell 56"(*iii*) to remote mirroring driver 46(B) of SSSA 32(B). Then, log parsing driver 45 reads (step 58) preexisting metadata from one or more metadata blocks 64 in persistent storage 38(B) of SSSA 32(B) (or from a cached version stored in memory 40(B)) to fill out the remainder of the MD buffer 70 not yet modified by any of the metadata changes 210. Then, remote disk driver 48 (step 74) writes the MD buffer 70 to persistent storage 38(B) of SSSA 32(B) based on instructions from the remote metadata write request shell 56"(*iii*) (e.g., with reference to the lower-deck address). In some embodiments in which the remote metadata write request shell 56"(*iii*) is not sent by PSSA 32(A), steps 58 and 74 may be performed directly after step 216. Finally, remote mirroring driver 46(B) returns an acknowledgment 224 to local mirroring driver 46(A), which in-turn sends an acknowledgment 225 to the filesystem driver 43.

Thus, techniques have been presented techniques for implementing synchronous replication in systems that use metadata journal logging to reduce the bandwidth needed over the mirroring channel 33. This result may be accomplished by refraining from mirroring metadata blocks 64 and instead playing back the metadata changes 210 at the mirrored location 32(B) using the mirrored metadata journal entries 68. In some embodiments, instead of mirroring a complete metadata write command over the mirroring channel, a shell metadata write command 56"(*iii*) may be sent in its place.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature, or act. Rather, the "first" item may be the only one. In addition, an identification herein of a particular element, feature, or act as being a "first" such element, feature, or act and another particular element, feature, or act as being a "second" such element, feature, or act should be construed as requiring that the "first" and "second" elements, features, or acts are different from each other, unless specified otherwise. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, Applicant makes no admission that any technique, method, apparatus, or other concept presented in this document is prior art under 35 U.S.C. § 102 or 35 U.S.C. § 103, such determination being a legal determination that depends upon many factors, not all of which are known to Applicant at this time.

What is claimed is:

1. A method of performing synchronous replication from a primary storage system apparatus (PSSA) to a secondary storage system apparatus (SSSA), the method comprising:
   in response to write requests received by the PSSA and directed to a filesystem on the PSSA, (i) calculating metadata changes by the PSSA for accommodating the write requests, the metadata changes including changes in a plurality of metadata blocks of the filesystem, (ii) generating, by the PSSA, metadata journal log entries that describe the metadata changes, and (iii) mirroring the metadata journal log entries but not the plurality of metadata blocks from the PSSA to the SSSA;
   regenerating the metadata changes by the SSSA based on the metadata journal log entries mirrored from the PSSA to the SSSA; and
   writing the regenerated metadata changes to persistent storage of the SSSA,
   wherein the metadata journal log entries generated by the PSSA are smaller than the plurality of metadata blocks.

2. The method of claim 1 wherein regenerating the metadata changes includes the SSSA playing metadata changes described by the metadata journal log entries into a metadata buffer.

3. The method of claim 2 wherein regenerating the metadata changes further includes the SSSA reading preexisting metadata into the metadata buffer.

4. The method of claim 3 wherein:
   playing the metadata changes is performed in response to the metadata journal log entries being mirrored from the PSSA to the SSSA;
   reading the preexisting metadata into the metadata buffer is performed in response to receiving a metadata write command shell from the PSSA, the metadata write command shell being received from the PSSA after the metadata journal log entries are mirrored from the PSSA to the SSSA; and
   writing the regenerated metadata changes includes writing the metadata buffer to the persistent storage of the SSSA after playing the metadata changes and reading the preexisting metadata into the metadata buffer.

5. The method of claim 4 wherein:
the metadata changes include changes to an upper-level filesystem, the upper-level filesystem having a first address space, the upper-level filesystem being stored on a virtual volume backed by a lower-level filesystem, the lower-level filesystem having a second address space distinct from the first address space; and
the metadata write command shell includes an address within the second address space to which the metadata changes are to be written.

6. The method of claim 3 wherein each of the metadata journal log entries includes a tag directing that the metadata changes described by that metadata journal log entry should be kept in cache until those metadata changes can be played into the metadata buffer.

7. The method of claim 3 wherein playing metadata changes described by the metadata journal log entries into the metadata buffer includes:
playing a first set of metadata changes described by a first metadata journal log entry into the metadata buffer;
subsequently, playing a second set of metadata changes described by a second metadata journal log entry into the metadata buffer, the second metadata journal log entry having been mirrored to the SSSA after the first metadata journal log entry, wherein playing the second set of metadata changes includes overwriting a metadata change played into the metadata buffer that was described by the first metadata journal log entry; and
writing the regenerated metadata changes includes writing the metadata buffer to the persistent storage of the SSSA after (a) playing the first set of metadata changes and the second set of metadata changes and (b) reading the preexisting metadata into the metadata buffer.

8. The method of claim 3 wherein:
playing the metadata changes and reading the preexisting metadata into the metadata buffer are performed in response to the metadata journal log entries being mirrored from the PSSA to the SSSA; and
writing the regenerated metadata changes includes writing the metadata buffer to the persistent storage of the SSSA in response to playing the metadata changes and reading the preexisting metadata into the metadata buffer.

9. A method performed by a secondary storage system apparatus (SSSA) of performing synchronous replication from a primary storage system apparatus (PSSA), the method comprising:
receiving mirrored metadata journal log entries from the PSSA, the mirrored metadata journal log entries having been generated by the PSSA in response to write requests received by the PSSA and directed to a filesystem on the PSSA by (i) calculating metadata changes for accommodating the write requests, the metadata changes including changes in a plurality of metadata blocks of the filesystem, (ii) generating the metadata journal log entries to describe the metadata changes, and (iii) mirroring the metadata journal log entries but not the plurality of metadata blocks from the PSSA to the SSSA;
regenerating the metadata changes based on the received metadata journal log entries mirrored from the PSSA to the SSSA; and
writing the regenerated metadata changes to persistent storage of the SSSA,
wherein the metadata journal log entries generated by the PSSA are smaller than the plurality of metadata blocks.

10. The method of claim 9 wherein regenerating the metadata changes includes the SSSA playing metadata changes described by the metadata journal log entries into a metadata buffer.

11. The method of claim 10 wherein regenerating the metadata changes further includes the SSSA reading preexisting metadata into the metadata buffer.

12. The method of claim 11 wherein:
playing the metadata changes is performed in response to the metadata journal log entries being mirrored from the PSSA to the SSSA;
reading the preexisting metadata into the metadata buffer is performed in response to receiving a metadata write command shell from the PSSA, the metadata write command shell being received from the PSSA after the metadata journal log entries are mirrored from the PSSA to the SSSA; and
writing the regenerated metadata changes includes writing the metadata buffer to the persistent storage of the SSSA after playing the metadata changes and reading the preexisting metadata into the metadata buffer.

13. The method of claim 12 wherein:
the metadata changes include changes to an upper-level filesystem, the upper-level filesystem having a first address space, the upper-level filesystem being stored on a virtual volume backed by a lower-level filesystem, the lower-level filesystem having a second address space distinct from the first address space; and
the metadata write command shell includes an address within the second address space to which the metadata changes are to be written.

14. The method of claim 11 wherein each of the metadata journal log entries includes a tag directing that the metadata changes described by that metadata journal log entry should be kept in cache until those metadata changes can be played into the metadata buffer.

15. The method of claim 11 wherein playing metadata changes described by the metadata journal log entries into the metadata buffer includes:
playing a first set of metadata changes described by a first metadata journal log entry into the metadata buffer;
subsequently, playing a second set of metadata changes described by a second metadata journal log entry into the metadata buffer, the second metadata journal log entry having been mirrored to the SSSA after the first metadata journal log entry, wherein playing the second set of metadata changes includes overwriting a metadata change played into the metadata buffer that was described by the first metadata journal log entry; and
writing the regenerated metadata changes includes writing the metadata buffer to the persistent storage of the SSSA after (a) playing the first set of metadata changes and the second set of metadata changes and (b) reading the preexisting metadata into the metadata buffer.

16. The method of claim 11 wherein:
playing the metadata changes and reading the preexisting metadata into the metadata buffer are performed in response to the metadata journal log entries being mirrored from the PSSA to the SSSA; and
writing the regenerated metadata changes includes writing the metadata buffer to the persistent storage of the SSSA in response to playing the metadata changes and reading the preexisting metadata into the metadata buffer.

17. A computer program product comprising a non-transitory computer-readable storage medium storing instructions, which, when performed by processing circuitry of a secondary storage system apparatus (SSSA), cause the SSSA to perform synchronous replication from a primary storage system apparatus (PSSA) by:

receiving mirrored metadata journal log entries from the PSSA, the mirrored metadata journal log entries having been generated by the PSSA in response to write requests received by the PSSA and directed to a filesystem on the PSSA by (i) calculating metadata changes for accommodating the write requests, the metadata changes including changes in a plurality of metadata blocks of the filesystem, (ii) generating the metadata journal log entries to describe the metadata changes, and (iii) mirroring the metadata journal log entries but not the plurality of metadata blocks from the PSSA to the SSSA;

regenerating the metadata changes based on the received metadata journal log entries mirrored from the PSSA to the SSSA; and writing the regenerated metadata changes to persistent storage of the SSSA, wherein the metadata journal log entries generated by the PSSA are smaller than the plurality of metadata blocks.

18. The computer program product of claim 17 wherein regenerating the metadata changes includes the SSSA playing metadata changes described by the metadata journal log entries into a metadata buffer.

19. The computer program product of claim 18 wherein regenerating the metadata changes further includes the SSSA reading preexisting metadata into the metadata buffer.

20. The computer program product of claim 19 wherein:

playing the metadata changes is performed in response to the metadata journal log entries being mirrored from the PSSA to the SSSA;

reading the preexisting metadata into the metadata buffer is performed in response to receiving a metadata write command shell from the PSSA, the metadata write command shell being received from the PSSA after the metadata journal log entries are mirrored from the PSSA to the SSSA; and writing the regenerated metadata changes includes writing the metadata buffer to the persistent storage of the SSSA after playing the metadata changes and reading the preexisting metadata into the metadata buffer.

21. The method of claim 1, wherein the plurality of metadata blocks includes an inode of a file and at least one indirect block for pointing to a new data block of the file.

22. The method of claim 1, further comprising, in response to write requests received by the PSSA, synchronously replicating the write requests to the SSSA, the synchronous replication enabling instant failover from the PSSA to the SSSA.

* * * * *